US009832614B2

(12) United States Patent
Zhang et al.

(10) Patent No.: US 9,832,614 B2
(45) Date of Patent: Nov. 28, 2017

(54) METHOD, SERVER AND TERMINAL FOR INFORMATION INTERACTION (71) Applicant: TENCENT TECHNOLOGY (SHENZHEN) COMPANY LIMITED, Shenzhen, Guangdong (CN)

(72) Inventors: Zhenwei Zhang, Guangdong (CN); Ling Wang, Guangdong (CN); Fen Xiao, Guangdong (CN); Zhehui Wu, Guangdong (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 92 days.

(21) Appl. No.: 14/307,243

(22) Filed: Jun. 17, 2014

(65) Prior Publication Data

US 2014/0295891 A1 Oct. 2, 2014

Related U.S. Application Data (63) Continuation of application No. PCT/CN2013/088338, filed on Dec. 3, 2013.

(30) Foreign Application Priority Data

Jan. 25, 2013 (CN) .......................... 2013 1 0029857

(51) Int. Cl.
*H04W 24/00* (2009.01)
*H04W 4/02* (2009.01)
(Continued)

(52) U.S. Cl.
CPC ............ *H04W 4/026* (2013.01); *H04L 67/18* (2013.01); *H04L 67/38* (2013.01); *H04W 4/02* (2013.01); *H04W 4/206* (2013.01)

(58) Field of Classification Search
CPC ....... H04W 4/02; H04W 4/026; H04W 4/206; H04L 67/38; H04L 67/18
(Continued)

(56) References Cited

U.S. PATENT DOCUMENTS

| 7,466,244 B2 * | 12/2008 | Kimchi | G01C 21/26 340/8.1 |
| 2010/0257195 A1 * | 10/2010 | Inoue | G01C 21/3602 707/769 |
| 2013/0016123 A1 * | 1/2013 | Skarulis | G09G 5/00 345/633 |

FOREIGN PATENT DOCUMENTS

| CN | 102123194 A | 7/2011 |
| CN | 102185878 A | 9/2011 |

(Continued)

OTHER PUBLICATIONS

Office Action issued in corresponding Chinese application No. 201310029857.1 dated Apr. 7, 2015 with a Concise English Explanation.

(Continued)

*Primary Examiner* — Lester Kincaid
*Assistant Examiner* — Sayed T Zewari
(74) *Attorney, Agent, or Firm* — Morgan, Lewis & Bockius LLP (57) ABSTRACT

It is provided a method, a server and a terminal for information interaction. One method for information interaction includes the following steps: obtaining, at a server, position information of a first terminal in a social network, direction information of the first terminal shooting a scene image, and an information search range corresponding to the first terminal; searching, at the server, for an information collection in the information search range corresponding to the first terminal in the social network according to the position information of the first terminal and the direction informa- (Continued)

tion of the first terminal shooting the scene image; and sending, at the server, the information collection to the first terminal so that the first terminal displays the information collection in the scene image shot by the first terminal.

9 Claims, 8 Drawing Sheets

(51) Int. Cl.
*H04L 29/08* (2006.01)
*H04L 29/06* (2006.01)
*H04W 4/20* (2009.01)

(58) Field of Classification Search
USPC ......... 455/456.1, 456.2, 456.3, 456.4, 456.5, 455/456.6, 457
See application file for complete search history.

(56) References Cited

FOREIGN PATENT DOCUMENTS

| | | |
|---|---|---|
| CN | 102789489 A | 11/2012 |
| CN | 103107938 A | 5/2013 |
| EP | 2400449 A | 12/2011 |

OTHER PUBLICATIONS

International Search Report issued in corresponding International Application No. PCT/CN2013/088338 dated Mar. 6, 2014.
Tencent Technology, Written Opinion, PCT/CN2013/088338, dated Mar. 6, 2014, 5 pgs.
Tencent Technology, IPRP, PCT/CN2013/088338, dated Jul. 28, 2015, 6 pgs.

* cited by examiner

| obtaining, at a first terminal, an information search range carried in an information search request when the first terminal in the social network receives the information search request, and detecting position information of the first terminal and direction information the first terminal shooting a scene image | S301 |

| sending, at the first terminal, the position information of the first terminal, the direction information of the first terminal shooting the scene image, and the information search range to a server, so that the server searches for in the social network and returns an information collection within the information search range | S302 |

| obtaining, at the first terminal, the scene image shot by the first terminal, and displaying the information collection in the scene image | S303 |

METHOD, SERVER AND TERMINAL FOR INFORMATION INTERACTION

CROSS REFERENCE TO RELATED APPLICATIONS

This application is a U.S. continuation application under 35 U.S.C. §111(a) claiming priority under 35 U.S.C. §§120 and 365(c) to International Application No. PCT/CN2013/088338 filed on Dec., 3, 2013, which claims the priority benefit of Chinese Patent Application No. 201310029857.1 filed on Jan. 25, 2013, the contents of which are incorporated by reference herein in their entirety for all intended purposes.

FIELD OF THE TECHNICAL

The disclosure relates to the field of internet technology, specifically to social network technology, and particularly to a method, a server, and a terminal for information interaction.

BACKGROUND

This section provides background information related to the present disclosure which is not necessarily prior art.

With the development of social network technology, users may interact with each other in a social network, such as making a topic, commenting on a topic, and so on. The information interaction of traditional social networks begins in virtual networks, and users may view the social information or perform social operations, but this kind of information interaction doesn't match and is not combined with a real scene, and doesn't enable users to quickly know about the social information happening around.

SUMMARY

Exemplary embodiments of the present invention provide a method, a server and a terminal for information interaction, in which the social information in the social network may be matched and combined with the real scene where the terminal is located, improving the flexibility of the information interaction and the intelligence of the social network.

According to one aspect of the invention, a method for information interaction is provided, including:

obtaining, at a server, position information of a first terminal in a social network and direction information of the first terminal shooting scene image and an information search range corresponding to the first terminal;

searching, at the server, for an information collection in the information search range corresponding to the first terminal in the social network according to the position information of the first terminal and the direction information of the first terminal shooting scene image;

and sending, at the server, the information collection to the first terminal so that the first terminal displays the information collection in the scene image shot by the first terminal.

According to another aspect of the invention, another method of information interaction is provided, including:

obtaining, at a first terminal, an information search range carried in an information search request when the first terminal in the social network receives the information search request, and detecting position information of the first terminal and direction information the first terminal shooting a scene image;

sending, at the first terminal, the position information of the first terminal, the direction information the first terminal shooting the scene image, and the information search range to a server, so that the server searches for in the social network and returns an information collection within the information search range according to the position information and the direction information of the first terminal shooting the scene image;

and obtaining, at the first terminal, the scene image shot by the first terminal and displaying the information collection in the scene image.

According to still another aspect of the invention, a server is provided, including:

an obtaining module configured to obtain position information of a first terminal in a social network and direction information the first terminal shooting a scene image and an information search range corresponding to the first terminal;

a searching module configured to searches for an information collection in the information search range corresponding to the first terminal in the social network according to the position information of the first terminal and the direction information the first terminal shooting the scene image;

and an interaction module configured to send the information collection to the first terminal so that the first terminal displays the information in a scene image shot by the first terminal.

According to still another aspect of the invention, a terminal is provided, including:

An obtaining module configured to receive an information search request, and obtain an information search range carried in the information search request;

a detecting module, configured to detect position information of the terminal and direction information of the terminal shooting a scene image;

and an interaction module configured to send the position information of the terminal, the direction information of the terminal shooting the scene image, and the information search range to a server, so that the server searches for in the social network and returns an information collection within the information search range; and a display module configured to obtain the scene image shot by the first terminal, and display the information collection in the scene image.

Beneficial effects of the technical solutions provided by the embodiments of the present invention are described as follows.

In various embodiments of the present invention, the server searches for an information collection in the information search range corresponding to the first terminal in the social network, according to the position information of the first terminal in the social network and the direction information of the first terminal shooting a scene image. The server sends the information collection obtained by searching to the first terminal, so that the first terminal displays the information collection in the scene image shot by the first terminal. With this embodiment of the present invention, the social information in the social network and the real scene where the terminal is located can be matched and combined with each other. The flexibility of the information interaction is improved, and the intelligence of the social network is enhanced.

BRIEF DESCRIPTION OF THE DRAWINGS

In order to illustrate various embodiments or existing technical solutions more clearly, a brief description of drawings that assists the description of embodiments of the invention or existing art will be provided below. It would be apparent that the drawings in the following description are only for some of the embodiments of the invention. A person having ordinary skills in the art will be able to obtain other drawings on the basis of these drawings without paying any creative work.

DETAILED DESCRIPTION OF ILLUSTRATED EMBODIMENTS

Technical solutions in embodiments of the present invention will be illustrated clearly and entirely with the aid of the drawings in the embodiments of the invention. It is apparent that the illustrated embodiments are only some embodiments of the invention instead of all of them. Other embodiments that a person having ordinary skills in the art obtains based on the illustrated embodiments of the invention without paying any creative work should all be within the protection scope sought by the present invention.

Figure 13:
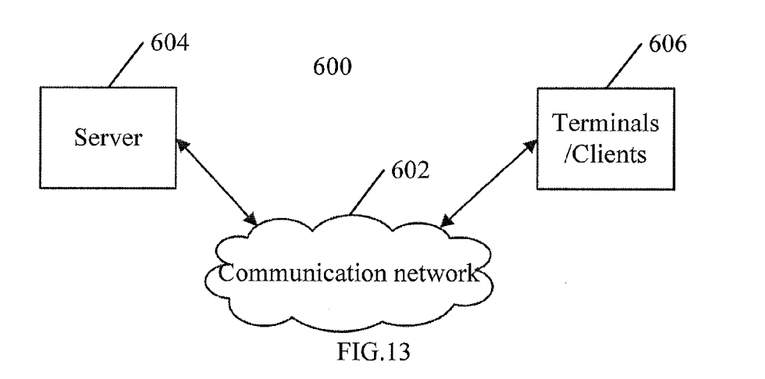
FIG. 13 depicts an exemplary environment incorporating certain disclosed embodiments.

FIG. 13 depicts an exemplary environment 600 incorporating exemplary methods and systems for information interaction in accordance with various disclosed embodiments. As shown in FIG. 13 the environment 600 can include a server 604, a terminal 606, and a communication network 602. The server 604 and the terminal 606 may be coupled through the communication network 602 for information interaction including, e.g., sending/receiving information such as position information, direction information, information collection, etc. Although only one terminal 606 and one server 604 are shown in the environment 600, any number of terminals 606 or servers 604 may be included, and other devices may also be included.

The communication network 602 may include any appropriate type of communication network for providing network connections to the server 604 and terminal 606 or among multiple servers 604 or terminals 606. For example, the communication network 602 may include the Internet or other types of computer networks or telecommunication networks, either wired or wireless.

A terminal, as used herein, may refer to any appropriate user terminal with certain computing capabilities, e.g., a personal computer (PC), a work station computer, a hand-held computing device (e.g., a tablet), a mobile terminal (e.g., a mobile phone or a smart phone), or any other client-side computing device.

A server, as used herein, may refer to one or more server computers configured to provide certain server functionalities, e.g., receiving/sending information such as position information and direction information, searching for data such as an information collection, etc. A server may also include one or more processors to execute computer programs in parallel.

The server 604 and the terminal 606 may be implemented on any appropriate computing platform.

Figure 14:
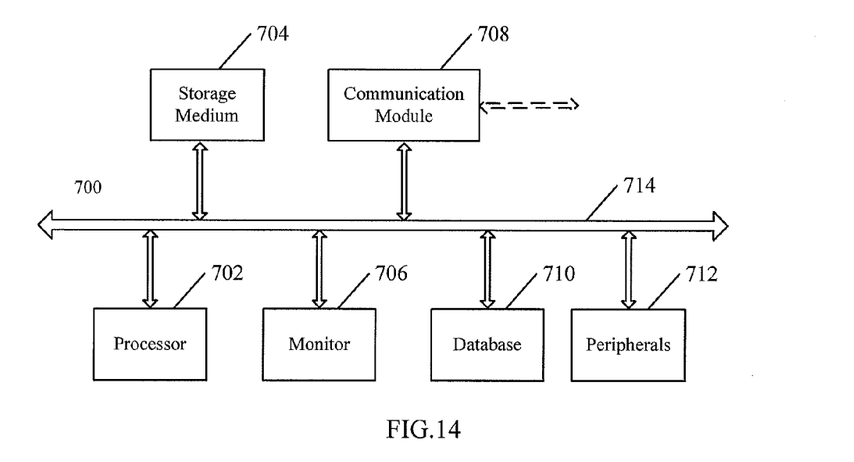
FIG. 14 depicts an exemplary computing system consistent with the disclosed embodiments.

FIG. 14 shows a block diagram of an exemplary computing system 700 (or computer system 700) capable of implementing the server 604 and/or the terminal 606. As shown in FIG. 7, the exemplary computer system 700 may include a processor 702, a storage medium 704, a monitor 706, a communication module 708, a database 710, peripherals 712, and one or more bus 714 to couple the devices together. Certain devices may be omitted and other devices may be included.

The processor 702 can include any appropriate processor or processors. Further, the processor 702 can include multiple cores for multi-thread or parallel processing. The storage medium 704 may include memory modules, e.g., Read-Only Memory (ROM), Random Access Memory (RAM), and flash memory modules, and mass storages, e.g., CD-ROM, U-disk, removable hard disk, etc. The storage medium 704 may store computer programs for implementing various processes (e.g., receiving/sending information such as position information and direction information, searching for data such as an information collection, etc), when executed by the processor 702.

The monitor 706 may include display devices for displaying contents in the computing system 700, e.g., displaying an information collection in a scene image. The peripherals 712 may include I/O devices such as keyboard and mouse.

Further, the communication module 708 may include network devices for establishing connections through the communication network 602. The database 710 may include one or more databases for storing certain data and for performing certain operations on the stored data, e.g., storing position information, direction information, and information collection, and corresponding relationship(s) there between, or any other suitable data, searching and management operations.

In operation, the terminal 606 may cause the server 604 to perform certain actions, e.g., obtaining information such as position information and direction information, searching for an information collection, sending the information collection to the terminal, etc. The server 604 may be configured to provide structures and functions for such actions and operations. More particularly, the server 604 may include a messaging server, a micro-blogging server, a forum server, or any other suitable servers for corresponding functions.

In various embodiments, a terminal involved in the disclosed methods and systems can include the terminal 606, while a server involved in the disclosed methods and systems can include the server 604. The methods and systems disclosed in accordance with various embodiments can be executed by a computer system. In one embodiment, the disclosed methods and systems can be implemented by a server.

Various embodiments provide methods, servers and terminals for information interaction. The methods, server and terminals are illustrated in various examples described herein.

In various embodiments of the present invention, a social network refers to an internet application service platform that builds a social-nature network for users, for example, a personal space, an interactive site, a forum, and other platforms. A first terminal may be any terminal in a social network, such as a mobile phone, a smart phone, a tablet PC, an electronic reader, a laptop, a smart watch, a smart car window, and other mobile device. Preferably, the first terminal may have an image shooting apparatus, such as camera and making the first terminal possess an image shooting function, and shoot a scene image of the scene where the first terminal is located. Preferably, the first terminal may have a displaying function which displays images shot by the image shooting apparatus. A second terminal is any terminal in the social network. The second terminal may be a PC (Personal Computer, PC), a mobile phone, a smart phone, a tablet PC, an electronic reader, a laptop, a smart watch, a smart car window, etc.

In the following, methods for information interaction provided by various embodiments of the present invention will be described in detail with reference to FIG. 1 to FIG. 5.

Figure 1:
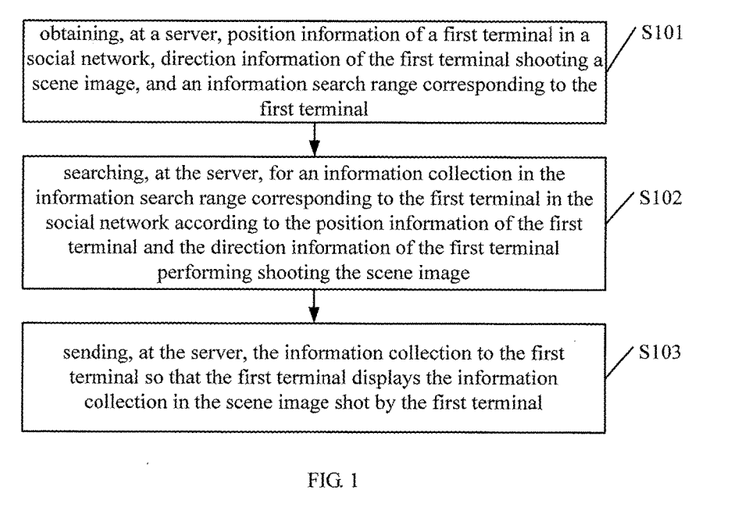
FIG. 1 is a flowchart of a method for information interaction according to an embodiment of the present invention.

Referring to FIG. 1, it is a flowchart of a method for information interaction provided by an embodiment of the present invention. In this embodiment, a method for information interaction is described from the server-side. The method may include the following steps: step 101 to step 103.

Step S101 is: obtaining, at a server, position information of a first terminal in a social network, direction information of the first terminal shooting a scene image, and an information search range corresponding to the first terminal.

The position information of the first terminal may be the geographical location of the first terminal. The geographical location may be expressed in latitude and longitude coordinates. The first terminal actively reports its position information to the server. The direction information of the first terminal is used to indicate the direction of the first terminal capturing image. The direction of the first terminal capturing image may be the shooting direction of the image shooting apparatus in the first terminal. For example, the camera of the first terminal may capture an image from western north 45 degree to eastern north 45 degree of the first terminal, and the direction indicated by the direction information of the first terminal may be the direction from western north 45 degree to eastern north 45 degree of the first terminal. The first terminal may actively report the direction information of the first terminal to the server.

An information search range corresponding to the first terminal may refer to a coverage area with a center of the first terminal location and a radius of a preset distance. For example, the information search range corresponding to the first terminal may be "a coverage area whose bound is 500 m away from the first terminal" or "a coverage area whose bound is 1000 m away from the first terminal." It should be noted that the information search range corresponding to the first terminal may be set by the first terminal, and the first terminal may set the information search range as required. Actual needs of the users at the first terminal may be taken into account in the setting process. For example, according to the actual needs of the user at the first terminal, the information search range may be set as "a coverage area whose bound is 100 m away from the first terminal". And the images capture ability of the first terminal may also be taken into account in the setting process. For example, if the image shooting apparatus of the first terminal may capture images within the range of 2000 m, the information search range should be set within this scope of the image shooting apparatus in the first terminal. The first terminal may actively report its set information search range to the server. It may be understood that, the information search range may be uniformly set by the server. For example, if the server sets the information search range as "a coverage area whose bound is 1000 m away from the terminal," so the information search range corresponding to the first terminal is "a coverage area whose bound is 1000 m away from the first terminal," and the information search range corresponding to the second terminal is "a coverage area whose bound is 1000 m away from the second terminal." In one embodiment of the present invention, in order to meet the customized needs of the end users, the information search range is preferably set by the terminals. For example, the information search range corresponding to the first terminal is set by the first terminal, the information search range corresponding to the second terminal is set by the second terminal, and so on.

Step S102 is: searching, at the server, for an information collection in the information search range corresponding to the first terminal in the social network according to the position information of the first terminal and the direction information of the first terminal performing shooting the scene image.

The content of the social network usually consists of all kinds of social information. Take a forum as an example, the content of the forum usually consists of topics made by users in the forum. These topics may be called as first social information. The users in the forum may perform social operations such as message, reply, comment, forward, etc. on the basis of these topics to generate second social information. Other users in the forum may again perform operations such as message, reply, comment, forward, etc. on the basis of these topics' message, reply, etc. to generate second social information. The first social information and the second social information form an information collection in this embodiment of the present invention. In a social network, the information collection may consist of only one piece of the first social information, or the information collection may consist of one piece of the first social information and at least one piece of the second social information generated by the social operation on the first social information. In this step, the server searches the social network for the information collection meeting conditions according to the position information, the direction information of the first terminal, and the information search range.

Step S103 is: sending, at the server, the information collection to the first terminal so that the first terminal displays the information collection in the scene image shot by the first terminal.

The server sends the information collection obtained by searching to the first terminal and the first terminal displays the information collection in the scene image shot by the first terminal, thereby combining the information collection in the social network with the real scene where the first terminal is located.

In this embodiment of the present invention, the server searches for an information collection in the information search range corresponding to the first terminal in the social network according to the position information of the first terminal in the social network and the direction information the first terminal shooting a scene image, and the server sends the information collection to the first terminal so that the first terminal displays the information collection in the scene image shot by the first terminal. In this embodiment of the present invention, social information in the social network and a real scene where the terminal is located may be matched and combined with each other. The flexibility of the information interaction is improved, and the intelligence of the social network is improved.

Figure 2:
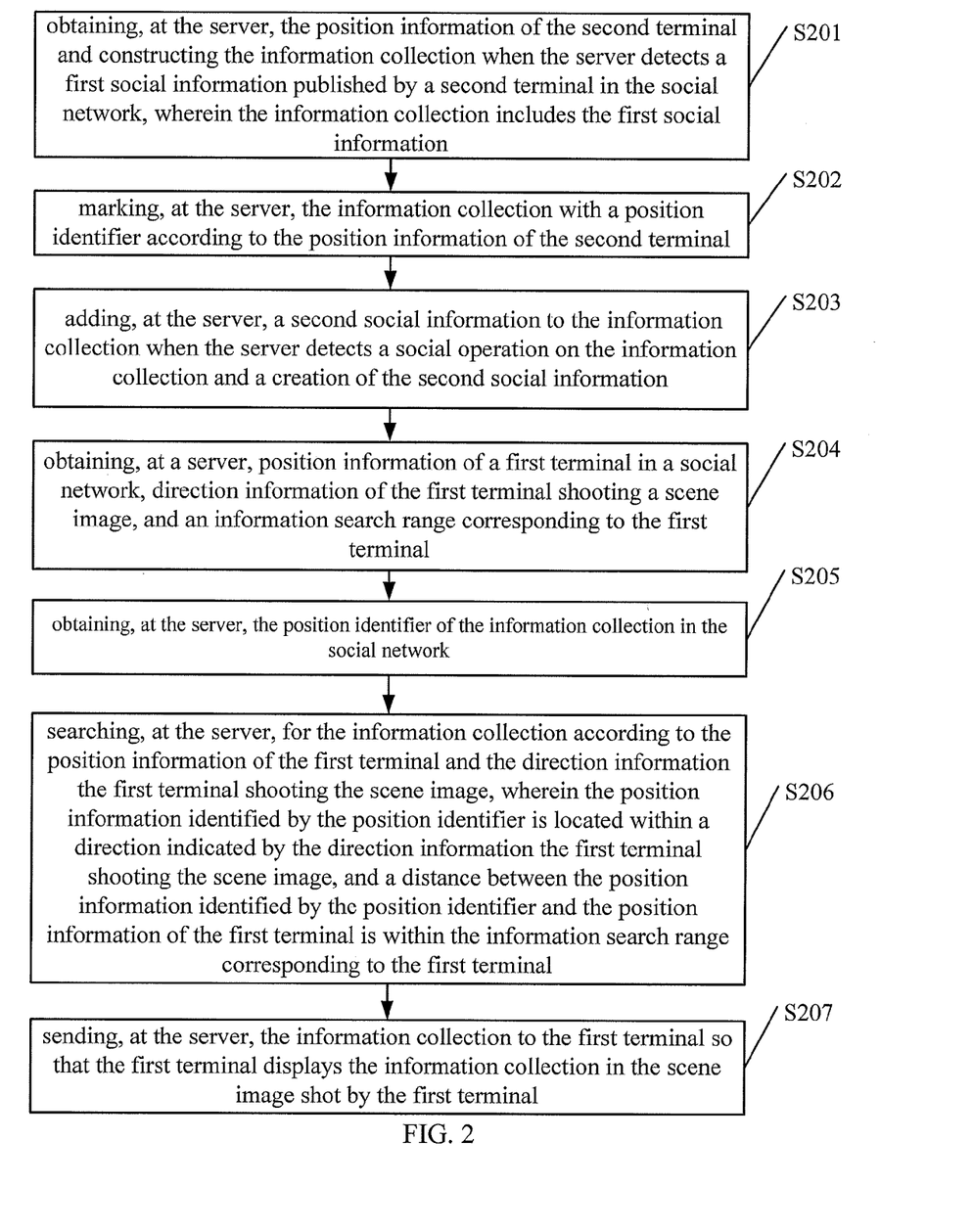
FIG. 2 is a flowchart of a method for information interaction according to another embodiment of the present invention.

Referring to FIG. 2, it is a flowchart of a method for information interaction provided by another embodiment of the present invention. In this embodiment, a flow of the method for information interaction from the server-side is described, including the following steps: step 201 to step 207.

Step S201 is: obtaining, at the server, the position information of the second terminal and constructing the information collection when the server detects a first social information published by a second terminal in the social network, wherein the information collection includes the first social information.

Figure 3:
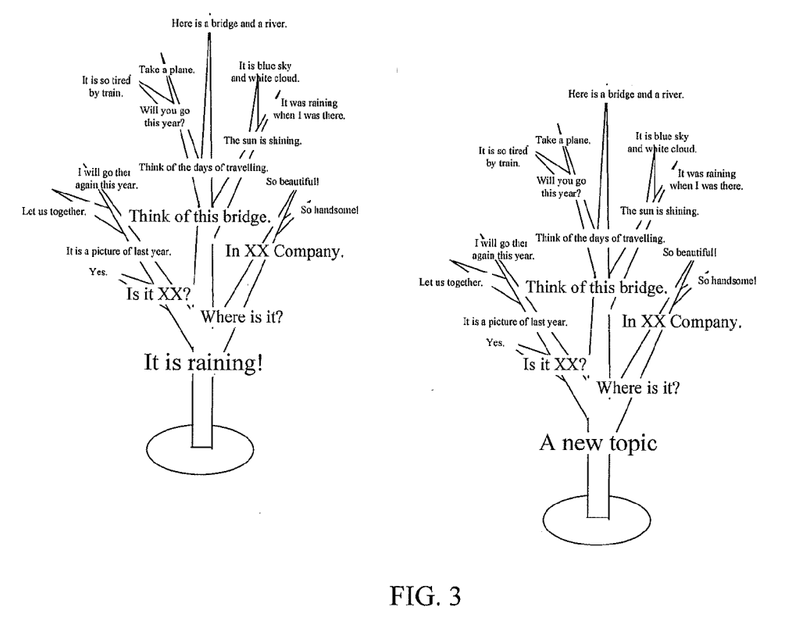
FIG. 3 is a structure diagram of information collection according to yet another embodiment of the present invention.

In the server, an information collection will be constructed when the second terminal in the social network makes a topic, and the information collection includes first social information generated by the second terminal making a topic. The server may store the information collection in a form of a list, and display the information collection in a form of a list. For example, in a forum and other social networks, the social information of the information collection is displayed in the form of list. In this embodiment of the present invention, the information collection may be stored in a tree structure in the server. When the information collection is displayed, it will be displayed in a tree structure, which makes the information collection more visual and vivid. Specifically, referring to FIG. 3, it is a schematic diagram showing the effect of the information collection provided by yet another embodiment of the present invention. FIG. 3 shows two information collections. The social information of the two information collections is stored in two tree structures, and the two information collections are displayed in form of tree structures.

It should be noted that, according to characteristics of the first social information in the information collection, the information collection stored in a tree structure may be displayed in virtual forms of all kinds of trees. For example, if the first social information of the information collection includes pictures and words, the tree structure may be displayed in virtual form of a tree, and the pictures of the first social information may be called as the fruits of the tree. Besides, if the first social information of the information collection only includes words, the tree structure may be displayed in a virtual form of a shrub. Furthermore, if the information collection only includes the first social information, the shrub will be displayed as slowly withered and aging. In one embodiment of the present invention, the virtual form of the tree may change according to the amount of the social information, types of social information, time point at which the social information is made, and other factors, including but not limited to the followings changes: type change of the virtual form, size change of the virtual form, color change of the virtual form, new or old degree change of the virtual form, and so on.

The position information of the second terminal is geographical location of the second terminal expressed in latitude and longitude coordinates. The process of the server obtaining the position information of the second terminal may have several embodiments. The first embodiment is that the second terminal actively reports its position information to the server when the second server makes a topic in the social network. The second embodiment is that, when the second terminal makes a topic in the social network, the server obtains the position information of the second terminal and communicates in real time with the second terminal based on GPS (Global Positioning System, GPS), mobile network, or other networks.

Step S202 is: marking, at the server, the information collection with a position identifier according to the position information of the second terminal.

The position identifier of the information collection is used to mark the location where the first social information of the information collection is made. In other words, the position identifier is used to identify the position information of the second terminal making the first social information.

Step S203 is: adding, at the server, a second social information to the information collection when the server detects a social operation on the information collection and a creation of the second social information.

Wherein, the social operation on the information collection includes but not limited to: leave a message, reply, forward, comment and other operation on the first social information of the information collection, or leave a message, reply, forward, comment and other operation on one or a plurality of the second social information.

Step S204 is: obtaining, at a server, position information of a first terminal in a social network, direction information of the first terminal shooting a scene image, and an information search range corresponding to the first terminal. This step may refer to S101 of the embodiment shown in FIG. 1, which herein would not be described in detail.

Step S205 is: obtaining, at the server, the position identifier of the information collection in the social network.

As mentioned above, the position identifier of the information collection is used to identify the location where the first social information of the information collection is made. One information collection of the social network corresponds to one position identifier. In the step, the server may obtain the position identifier of the information collection in the social network.

Step S206 is: searching, at the server, for the information collection according to the position information of the first terminal and the direction information the first terminal shooting the scene image, wherein the position information identified by the position identifier is located within a direction indicated by the direction information the first terminal shooting the scene image, and a distance between the position information identified by the position identifier and the position information of the first terminal is within the information search range corresponding to the first terminal.

The searching process of step 206 may be: first, the server searches for the information collection meeting conditions from the social network, namely, the server searches for the information collection whose position information identified by the position identifier locates within the direction indicated by the direction information the first terminal shooting the a scene image. For example, if the direction indicated by the direction information of the first terminal shooting the scene image is from western north 45 degree to eastern north 45 degree of the first terminal. According to the position information, if the server searches for that the position information identified by the position identifier of the information collection A, in the social network, locates in the north of the first terminal, the server will confirm that the position information identified by the position identifier of the information collection A, locates within the direction indicated by the direction information the first terminal shooting a scene image, and the information collection A meets the direction condition. It should be noted that the above search process is just an example. In practice, the server may search for the information collection meeting range condition, and then search the information meeting range condition for the information collection meeting direction condition. Under this situation, it may be a similar analysis, and which herein would not be described in detail.

Step S207 is: sending, at the server, the information collection to the first terminal so that the first terminal displays the information collection in the scene image shot by the first terminal. This step may refer to the step 103 in FIG. 1 of the embodiment, which herein would not be described in detail.

In this embodiment of the present invention, the server searches for an information collection in the information search range corresponding to the first terminal in the social network, according to the position information of the first terminal in the social network and the direction information the first terminal shooting scene image. The server sends the information collection to the first terminal so that the first terminal displays the information collection in the scene image shot by the first terminal. With this embodiment of the present invention, social information in the social network and a real scene where the terminal is located may be matched and combined. The flexibility of the information interaction is improved, and the intelligence of the social network is improved.

Figure 4:
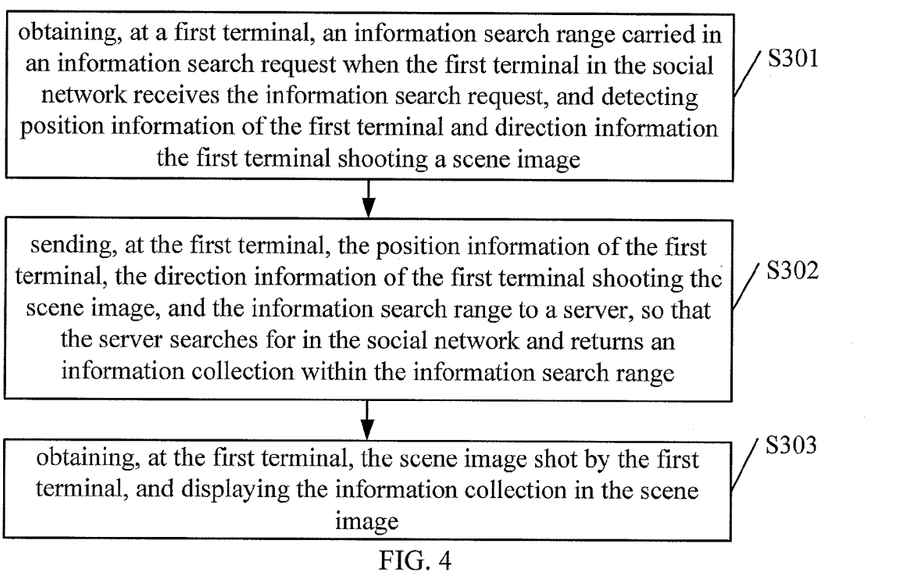
FIG. 4 is a flowchart of a method for information interaction according to yet another embodiment of the present invention.

Referring to FIG. 4, it is a flowchart of a method for information interaction provided by yet another embodiment of the present invention. This embodiment describes the flow of the method for information interaction from the first terminal side. The method includes the steps: step 301 to step 303.

Step S301 is: obtaining, at a first terminal, an information search range carried in an information search request when the first terminal in the social network receives the information search request, and detecting position information of the first terminal and direction information the first terminal shooting a scene image.

When a user at the first terminal starts an information search function of the social network, the user may send an information search request. The first terminal receives the information search request. In practice, the user at the first terminal may preset an information search range before starts the information search function of the social network and the preset information search range may be obtained by the first terminal from the information search request. The user at the first terminal may also set the information search range in real time when starts the information search function of the social network, and the information search range set in real time may be obtained by the first terminal from the information search request. In this step, when the first terminal receives the information search request, the first terminal will detect its position information. Specifically, the first terminal may use a position detecting tool, such as a GPS application or others, installed in the first terminal, to detect its position information. The first terminal may also detect its position information by means of the GPS or the mobile network.

Step S302 is: sending, at the first terminal, the position information of the first terminal, the direction information of the first terminal shooting the scene image, and the information search range to a server, so that the server searches for in the social network and returns an information collection within the information search range.

Step S303 is: obtaining, at the first terminal, the scene image shot by the first terminal, and displaying the information collection in the scene image.

The first terminal may shoot the scene image of the scene where the first terminal is located, by using the image shooting apparatus of the first terminal. It should be noted that, if the scene image of the scene where the first terminal is located is dynamic image, the scene image will change as the first terminal moves. In this step, the first terminal displays the information collection in the scene image shot by the first terminal, so that the first terminal realizes the combination of the information collection in the social network and the real scene where the first terminal is located.

In this embodiment of the present invention, the server searches for an information collection in the information search range corresponding to the first terminal in the social network, according to the position information of the first terminal in the social network and the direction information of the first terminal shooting a scene image. The server sends the information collection to the first terminal, so that the first terminal displays the information collection in the scene image shot by the first terminal. With this embodiment of the present invention, social information in the social network and a real scene where the terminal is located, may be matched and combined. The flexibility of the information interaction is improved, and the intelligence of the social network is improved.

Figure 5:
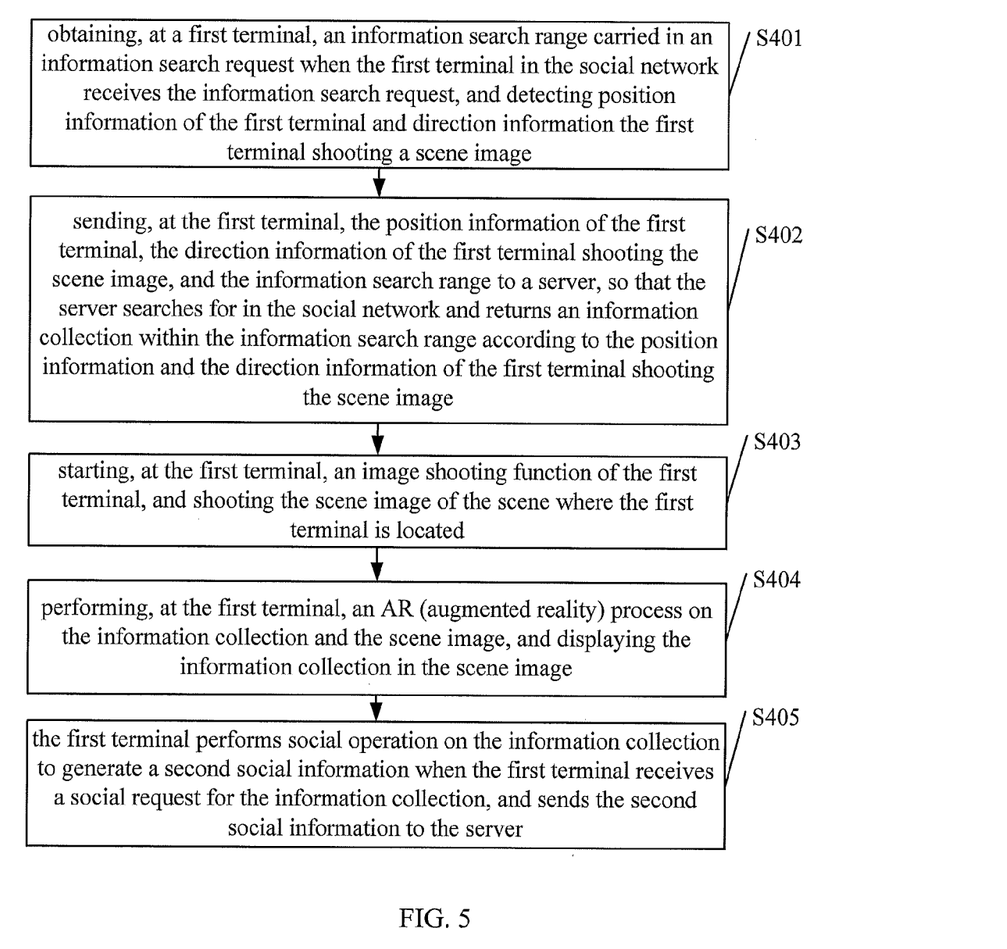
FIG. 5 is a flowchart of a method for information interaction according to yet another embodiment of the present invention.

Referring to FIG. 5, it is a flowchart of a method for information interaction provided by yet another embodiment of the present invention, which describes the method for information interaction from a terminal. This method may include the following steps: step 401 to step 405.

Step S401 is: obtaining, at a first terminal, an information search range carried in an information search request when the first terminal in the social network receives the information search request, and detecting position information of the first terminal and direction information the first terminal shooting a scene image.

Step S402 is: sending, at the first terminal, the position information of the first terminal, the direction information of the first terminal shooting the scene image, and the information search range to a server, so that the server searches for in the social network and returns an information collection within the information search range according to the position information and the direction information of the first terminal shooting the scene image.

In this embodiment, step 401 to step 402 may refer to step 301 to step 302 of the embodiment in FIG. 4, which herein would not be described in detail.

Step S403 is: starting, at the first terminal, an image shooting function of the first terminal, and shooting the scene image of the scene where the first terminal is located.

As mentioned above, in this embodiment, the first terminal preferably has image shooting apparatus, such as camera and making the first terminal possess an image shooting function, and shoot a scene image of the scene where the first terminal is located. If the scene image of the scene where the first terminal is located is dynamic image, the scene image will change as the first terminal moves.

Step S404 is: performing, at the first terminal, an AR (augmented reality) process on the information collection and the scene image, and displaying the information collection in the scene image.

Figure 6:
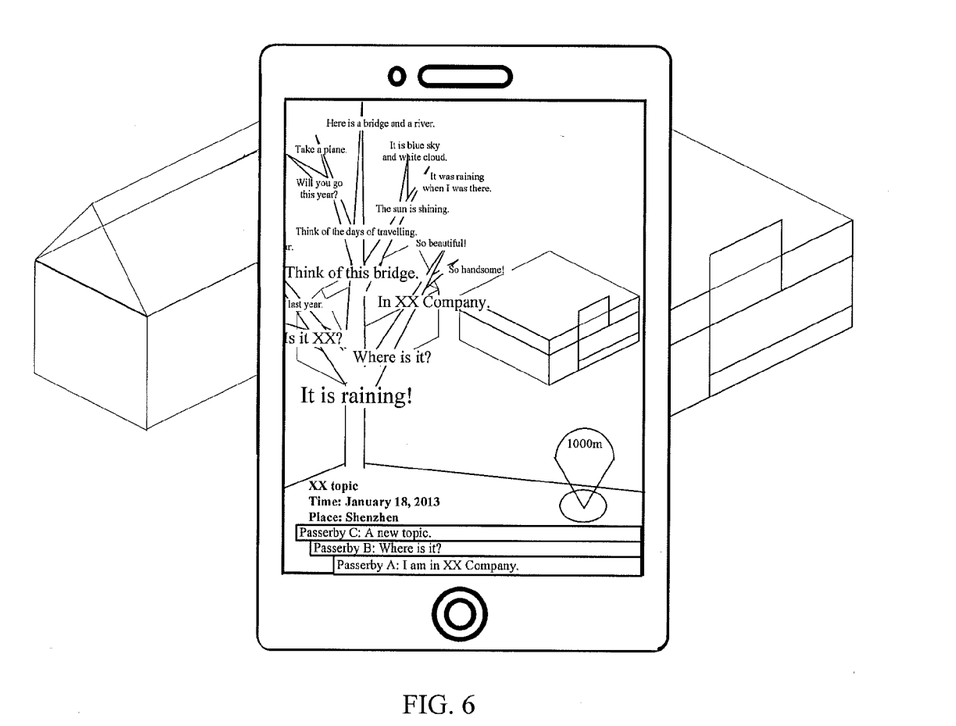
FIG. 6 is a display schematic of information collection according to yet another embodiment of the present invention.

As mentioned above, the information collection may be stored in the server in a form of a tree structure. In the present step, the first terminal may add the information collection to the scene image and perform an AR process on them, so that the information collection may be displayed in the scene image. Specifically referring to FIG. 6, it is a schematic diagram of the displayed information collection provided by yet another embodiment of the present invention. The first terminal in FIG. 6 is a mobile phone. In the mobile phone, the information collection obtained by the server through searching is displayed in the scene image shot by the mobile phone, so that it is realized that the information collection in the social network is combined with the real scene where the mobile phone is located.

Step S405 is: the first terminal performs social operation on the information collection to generate a second social information when the first terminal receives a social request for the information collection, and sends the second social information to the server.

The user at the first terminal may perform social operation on the information collection displayed in the scene image of the first terminal. Specifically, when the user at the first terminal clicks the tree structure information collection as shown in FIG. 6, the first terminal will receive a social request for the information collection. According to an instruction made by the user of the first terminal, the first terminal performs the social operation to generate second social information, and sends the second social information to the server. The server adds the second social information to the information collection.

In this embodiment of the present invention, the server searches for an information collection in the information search range corresponding to the first terminal in the social network, according to the position information of the first terminal in the social network and the direction information the first terminal shooting a scene image. The server sends the information collection to the first terminal, so that the first terminal displays the information collection in the scene image shot by the first terminal. With this embodiment of the present invention, social information in the social network and a real scene where the terminal is located may be matched and combined. The flexibility of the information interaction is improved, and the intelligence of the social network is improved. At the same time, the user at the first terminal may also perform the social operation on the information collection displayed by the first terminal, which improves user stickiness in the social network.

Figure 7:
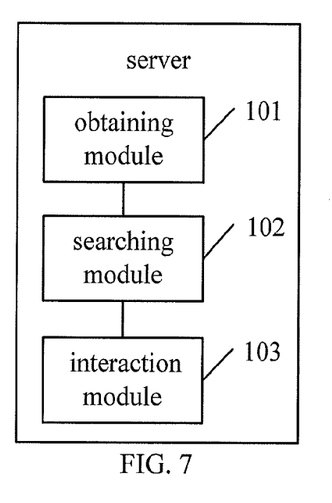
FIG. 7 is a structure diagram of a server according to yet another embodiment of the present invention.
Figure 8:
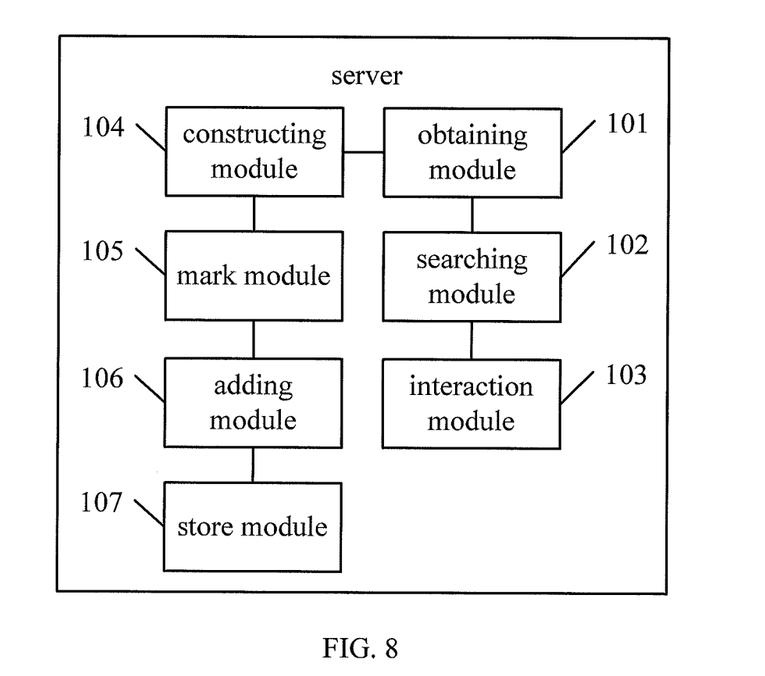
FIG. 8 is a structure diagram of another server according to yet another embodiment of the present invention.
Figure 9:
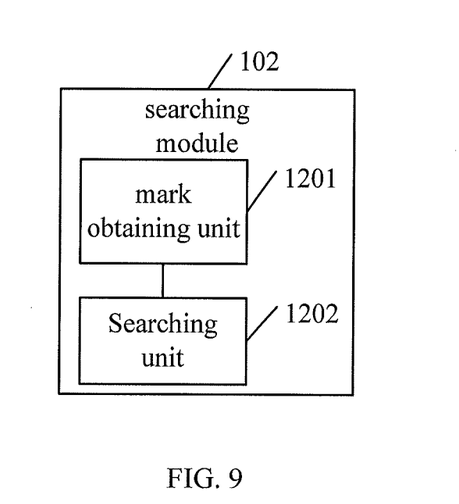
FIG. 9 is a structure diagram of searching module according to yet another embodiment of the present invention.

With the aid of FIG. 7 to FIG. 9, the structure of a server provided by embodiments of the present invention will be illustrated in detail.

It should be noted that, the following described server may be applied to the above described methods.

Please referring to FIG. 7, it is a structure diagram of a server provided by yet another embodiment of the present invention. The server may include an obtaining module 101, a searching module 102 and an interaction module 103.

The obtaining module 101 is configured to obtain position information of a first terminal in a social network, direction information the first terminal shooting a scene image, and an information search range corresponding to the first terminal.

The position information of the first terminal is the geographic location of the first terminal expressed in latitude and longitude coordinates. The first terminal actively reports its position information to the server, and the obtaining module 101 actively obtains the position information reported actively by the first terminal. The direction information of the first terminal is used to indicate the direction of the first terminal capturing image. The direction of the first terminal capturing image may be the shooting direction of the image shooting apparatus in the first terminal. For example, the camera of the first terminal may capture image from western north 45 degree to eastern north 45 degree of the first terminal. The direction information of the first terminal may indicate the direction from western north 45 degree to eastern north 45 degree of the first terminal. The first terminal may actively reports its direction information to the server, and the obtaining module 101 actively obtains the direction information reported actively by the first terminal.

An information search range corresponding to the first terminal may refer to a coverage area with a center of the first terminal location and a radius of a preset distance. For example, the information search range corresponding to the first terminal may be "a coverage area whose bound is 500 m away from the first terminal" or "a coverage area whose bound is 1000 m away from the first terminal." It should be noted that the information search range corresponding to the first terminal may be set by the first terminal, and the first terminal may set the information search range as required. Actual needs of the users at the first terminal may be taken into account in the setting process. For example, according to the actual needs of the user at the first terminal, the information search range may be set as "a coverage area whose bound is 1000 m away from the first terminal". And the images capture ability of the first terminal may be also taken into account in the setting process. For example, the image shooting apparatus of the first terminal may capture images within the range of 2000 m, so the set information search range should be within the imaging scope of the image shooting apparatus of the first terminal. The first terminal may actively reports the information search range set by the first terminal, to the server. The obtaining module 101 actively obtains the information search range reported actively by the first terminal set. It may be understood that, the information search range may be set by the server. For example, the server sets the information search range 1000 m from the scope of the terminal, so the information search range corresponding to the first terminal is 1000 m from the scope of the terminal, and the information search range corresponding to the second terminal is 1000 m from the scope of the terminal. In this embodiment of the present invention, in order to meet the customized needs of the end users, the information search range is preferably set by the terminals. For example, the information search range corresponding to the first terminal is set by the first terminal; the information search range corresponding to the second terminal is set by the second terminal and so on. The obtaining module 101 obtains the information search range corresponding to the first terminal, according to unified setting of the server.

The searching module 102 is configured to searches for an information collection in the information search range corresponding to the first terminal in the social network, according to the position information of the first terminal and the direction information the first terminal shooting a scene image.

The searching module 102 searches the social network for the information collection meeting conditions, according to position information of the first terminal, direction information and the set information search range.

Interaction module 103 is configured to send the information collection to the first terminal, so that the first terminal displays the information in a scene image shot by the first terminal.

The interaction module 103 sends the information collection to the first terminal, and the first terminal displays the information collection in the scene image shot by the first terminal, which implements the combination of the information collection in the social network and the real scene where the first terminal is located.

In this embodiment of the present invention, the server searches for an information collection in the information search range corresponding to the first terminal in the social network, according to the position information of the first terminal in the social network and the direction information the first terminal shooting a scene image. The server sends the information collection to the first terminal, so that the first terminal displays the information collection in the scene image shot by the first terminal. With this embodiment of the present invention, social information in the social network and a real scene where the terminal is located may be matched and combined. The flexibility of the information interaction is improved and the intelligence of the social network is improved.

Referring to FIG. 8, it is a structure diagram of another server provided by yet another embodiment of the present invention provides. The server may include the obtaining module 101, the searching module 102, the interaction module 103, a constructing module 104, a mark module 105, an adding module 106 and a storage module 107.

The structures of the obtaining module 101, the searching module 102 and the interaction module 103, may be referred to related description of the embodiment shown in FIG. 7, which would not be described in detail.

The constructing module 104 is configured to detect a first social information published by a second terminal in the social network, obtain the position information of the second terminal, and construct the information collection, wherein the information collection includes the first social information.

The content of the social network usually consists of all kinds of social information. Take a forum as an example, the content of the forum usually consists of topics made by users in the forum. These topics may be called as first social information. The users of the forum may perform social operations such as message, reply, comment, forward, etc. on the basis of these topics to generate second social information. Other users in the forum may perform social operations such as again message, reply, comment, forward, etc. on the basis of these topics' message, reply, comment, forward and other social operation to generate second social information. The first social information and the second social information are composed of an information collection said by this embodiment of the present invention.

In the social network, the information collection may consist of only one piece of the first social information. Besides, the information collection may consist of one piece of the first social information and at least one piece of the second social information generated by the social operation on the first social information.

The mark module 105 is configured to mark the information collection with a position identifier, according to the position information of the second terminal.

Wherein, the position identifier of the information collection is used to identify the location where the first social information of the information collection is published. In other words, the position identifier is used to identify the position information where the second terminal generates the first social information.

The adding module 106 is configured to detect a social operation on the information collection, generate the second social information, and add the second social information to the information collection.

Wherein, the social operation on the information collection includes but not limited to: leave a message, reply, forward, comment and other operation on the first social information of the information collection. Besides, leave a message, reply, forward, comment and other operation on one or a plurality of pieces of the second social information.

The storage module 107 is configured to store the information collection in a tree structure.

The storage module 107 may store the information collection in a tree structure, which makes the information collection more visual and vivid. The storage mode in a tree structure may be referred to FIG. 3. It should be noted that, according to characteristics of the first social information in the information collection, the information collection stored in a tree structure may be displayed in virtual forms of all kinds of trees. For example, if the first social information of the information collection includes pictures and words, the tree structure may be displayed in a tree virtual form, and the pictures of the first social information may be called as the fruits of the tree. Besides, if the first social information of the information collection only includes words, the tree structure may be displayed in shrub virtual form. Furthermore, if the information collection only includes the first social information, the shrub will be displayed as slowly withered and aging. In the embodiment of the present invention, the virtual form displayed by the tree structure may change according to number of the social information, type of social information, time point of social information made and other factors. Including but not limited to the followings: type change of virtual form, size change of virtual form, color changes of virtual form, new or old degree changes of virtual form and other changing factors. This will be understood that, the storage module 107 may store the information collection in a form of a list structure, and display the information collection in a list structure. For example, in a forum and other social networks, the social information of the information collection may be displayed in a list structure.

In this embodiment of the present invention, the server searches for an information collection in the information search range corresponding to the first terminal in the social network, according to the position information of the first terminal in the social network and the direction information the first terminal shooting a scene image. The server sends the information collection to the first terminal, so that the first terminal displays the information collection in the scene image shot by the first terminal. With this embodiment of the present invention, the social information in the social network and a real scene where the terminal is located, may be matched and combined. The flexibility of the information interaction is improved, and the intelligence of the social network is improved.

Referring to FIG. 9, it is a structure diagram of the searching module provided by yet another embodiment of the present invention. The searching module 102 may include a mark obtaining unit 1201 and a searching unit 1202.

The mark obtaining unit 1201 is configured to obtain a position identifier of an information collection in the social network.

The position identifier of the information collection is configured to identify the position where the first social information of the information collection is published. One information collection of the social network corresponds to one position identifier.

The searching unit 1202 is configured to search for the information collection according to the position information of the first terminal and the direction information the first terminal shooting a scene image, wherein position information identified by position identifier is located within a direction indicated by the direction information the first terminal shooting a scene image, and the distance between the position information identified by the position identifier and the position information of the first terminal is within the information search range corresponding to the first terminal.

The searching process of the searching unit 1202 is: first, search for the information collection meeting direction conditions from the social network, namely, search for the information collection, whose position information identified by position identifier; locates within the direction indicated by the direction information the first terminal shooting the scene image. It should be noted that, the above searching process is just an example. In practice, the searching unit 1202 may also search for the information collection meeting range condition, and then search the information meeting range condition for the information collection meeting direction condition. Under this situation, it may be a similar analysis, which herein would not be described in detail.

It should be noted that the structure and function of the server provided by the embodiment of the present invention may be realized according to the method embodiment shown in the above FIG. 1 to FIG. 3, so the specific realization process may be referred to the description of the above embodiments, which herein would not be described in detail.

In this embodiment of the present invention, the server searches for an information collection in the information search range corresponding to the first terminal in the social network, according to the position information of the first terminal in the social network and the direction information the first terminal shooting a scene image. The server sends the information collection to the first terminal, so that the first terminal displays the information collection in the scene image shot by the first terminal. With this embodiment of the present invention, the social information in the social network and a real scene where the terminal is located can be matched and combined. The flexibility of the information interaction is improved, and the intelligence of the social network is improved.

Figure 10:
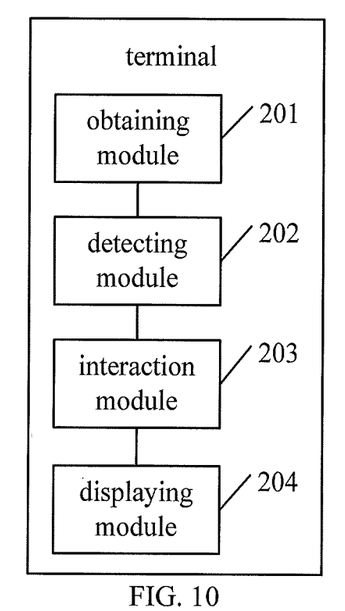
FIG. 10 is a structure diagram of a terminal according to yet another embodiment of the present invention.
Figure 11:
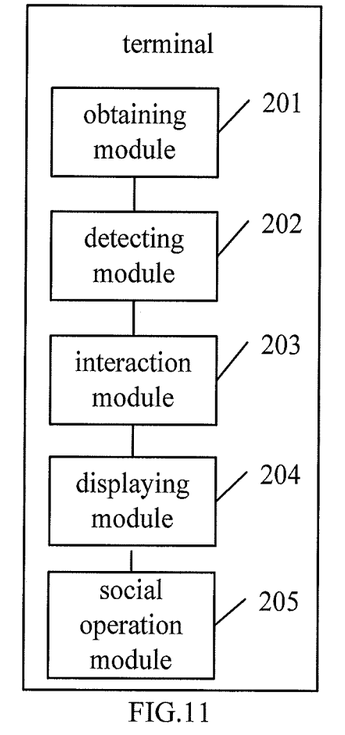
FIG. 11 is a structure diagram of another terminal according to yet another embodiment of the present invention.
Figure 12:
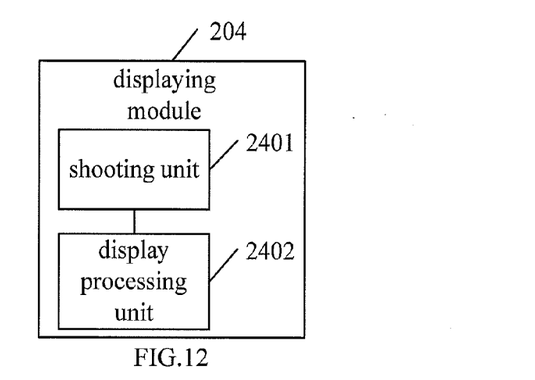
FIG. 12 is a structure diagram of display module according to yet another embodiment of the present invention.

With the aid of FIG. 10 to FIG. 12, a terminal provided by yet another embodiment of the present invention will be illustrated in detail. It should be noted that, the following terminal may be the first terminal said by the embodiment of the present invention, and the following terminal may be applied to the above methods.

Referring to FIG. 10, it is a structure diagram of a terminal provided by yet another embodiment of the present invention. The terminal may include an obtaining module 201, a detecting module 202, an interaction module 203 and a displaying module 204.

The obtaining module 201 is configured to receive an information search request, and obtain an information search range carried in the information search request.

When a user at the first terminal starts an information search function of the social network, the user may send an information search request. The first terminal receives the information search request. In practice, the user at the first terminal may preset an information search range, before starts the information search function of the social network. The preset information search range may be obtained by the obtaining module 201 from the information search request. The user at the first terminal may also set the information search range in real time when starts the information search function of the social network. The set information search range in real time may be obtained by the obtaining module 201 from the information search request.

The detecting module 202 is configured to detect position information and direction information of the terminal.

The detecting module 202 detects the position information of the first terminal, which may be specifically performed by using a position detecting tool installed in the first terminal, such as GPS application to detect the position information of the first terminal; or, detecting the position information of the first terminal with the aid of GPS or mobile network. The detecting module 202 detects the direction information the first terminal shooting a scene image, which may be specifically performed by: using an orientation sensor installed in the first terminal, such as gravity sensor and compass to obtain sensor data, and analyzing the sensor data to get direction information; or, receiving the user at the first terminal confirmed direction information when shooting the scene image.

The interaction module 203 is configured to send the position information and the direction information of the terminal, and the information search range to a server, so that the server searches for, in the social network, and returns an information collection within the information search range.

The display module 204 is configured to obtain a scene image shot by the first terminal, and display the information collection in the scene image.

The displaying module 204 may shoot the scene image of the scene where the first terminal is located, by using the image shooting apparatus of the first terminal. It should be noted that, if the scene image of the scene where the first terminal is located, is dynamic image, the scene image will change as the first terminal moves. The displaying module 204 displays the information collection in the scene image shot by the first terminal, specifically refer to FIG. 6, so that the first terminal realizes the combination of the information collection in the social network and the real image of the scene where the first terminal is located.

In this embodiment of the present invention, the server searches for an information collection in the information search range corresponding to the first terminal in the social network, according to the position information of the first terminal in the social network and the direction information of the first terminal shooting the scene image. The server sends the information collection to the first terminal, so that the first terminal displays the information collection in the scene image shot by the first terminal. With this embodiment of the present invention, the social information in the social network and a real scene where the terminal is located may be matched and combined. The flexibility of the information interaction is improved, and the intelligence of the social network is improved.

Referring to FIG. 11, it is a structure diagram of another terminal provided by yet another embodiment of the present invention. The terminal may include the obtaining module 201, the detecting module 202, the interaction module 203, the displaying module 204, and a social operation module 205. For the structures of the obtaining module 201, the searching module 202, the interaction module 203 and the displaying module 204, one may refer to related description of the embodiment shown in FIG. 10, which would not be described here in detail to avoid redundancy.

The social operation module 205 is configured to perform a social operation on the information collection to generate second social information when the social operation module 205 receives a social request for the information collection, and sends the second social information to the server.

The user at the first terminal may perform social operation on the information collection displayed in the scene image of the first terminal. Specifically, when the user at the first terminal clicks information collection in a tree structure shown in FIG. 6, a social request for the information collection is sent. According to an instruction made by the user at the first terminal, the social operation module 205 performs the social operation to generate second social information, and sends the second social information to the server. The server adds the second social information to the information collection.

In this embodiment of the present invention, the server searches for an information collection in the information search range corresponding to the first terminal in the social network, according to the position information of the first terminal in the social network and the direction information the first terminal shooting a scene image. The server sends the information collection to the first terminal, so that the first terminal displays the information collection in the scene image shot by the first terminal. With this embodiment of the present invention, the social information in the social network and a real scene where the terminal is located may be matched and combined. The flexibility of the information interaction is improved, and the intelligence of the social network is improved. At the same time, the user at the first terminal may also perform the social operation on the information collection displayed by the first terminal, which improves user stickiness in the social network.

Referring to FIG. 12, it is a structure diagram of the displaying module provided by yet another embodiment of the present invention. The displaying module 204 may include a shooting unit 2401 and a display processing module 2402.

The shooting unit 2401 is configured to start an image shooting function, and shoot the scene image of the scene where the terminal is located.

As mentioned above, in this embodiment of the present invention, preferably the first terminal may have an image shooting apparatus, such ascamera and making the first terminal possess an image shooting function. The shooting unit 2401 may shoot a scene image of the scene where the first terminal is located, with image shooting apparatus of the first terminal. If the scene image of the scene where the first terminal is located is dynamic image, the scene image will change as the first terminal moves.

The display processing unit 2402 is configured to perform an AR (Augmented Reality) process on the information collection and the scene image, and display the information collection in the scene image.

As mentioned above, the information collection is stored in the server in a form of a tree structure. The display processing unit 2402 may add the information collection to the scene image to perform AR process, so that the information collection is displayed in the scene image.

It should be noted that the structures and functions of the terminals provided by various embodiments of the present invention may be concretely realized according to the method embodiments shown in FIGS. 4-6. For the specific realization, one may refer to the description of the above method embodiments, which herein would not be described in detail to avoid redundancy.

In this embodiment of the present invention, the server searches for an information collection in the information search range corresponding to the first terminal in the social network, according to the position information of the first terminal in the social network and the direction information the first terminal shooting the scene image. The server sends the information collection to the first terminal, so that the first terminal displays the information collection in the scene image shot by the first terminal. With this embodiment of the present invention, the social information in the social network and a real scene where the terminal is located may be matched and combined. The flexibility of the information interaction is improved, and the intelligence of the social network is improved.

A person having ordinary skills in the art may realize that part or whole of the processes in the methods according to the above embodiments may be implemented by a computer program instructing relevant hardware. The program may be stored in a computer readable storage medium. When executed, the program may execute processes in the above-mentioned embodiments of methods. The storage medium may be a magnetic disk, an optical disk, a Read-Only Memory (ROM), a Random Access Memory (RAM), et al.

The above descriptions are some exemplary embodiments of the invention, and should not be regarded as limitation to the scope of related claims. A person having ordinary skills in a relevant technical field will be able to make improvements and modifications within the spirit of the principle of the invention. The improvements and modifications should also be incorporated in the scope of the claims attached below.

What is claimed is:

1. A method for information interaction, comprising the steps of:

obtaining, at a server, position information of a first terminal running a social network application, direction information of the first terminal shooting a scene image, and an information search range corresponding to the first terminal, wherein the information search range corresponding to the first terminal represents a coverage area with a center of the first terminal location and a radius of a preset distance, and the preset distance is set according to an image capture ability of an image shooting apparatus in the first terminal;

searching, at the server, among a plurality of social information items published by one or more terminals running the social network application, for an information collection in the information search range corresponding to the first terminal according to the position information of the first terminal and the direction information of the first terminal shooting the scene image, wherein the information collection includes a subset of the plurality of social information items published by the one or more terminals and has a position identifier corresponding to position information of one of the one or more terminals when it submits a corresponding social information item to the server, each social information item being a message posted by a respective user of a terminal using the social network application, and the position identifier is within a direction defined by the direction information of the first terminal when shooting the scene image and within the information search range corresponding to the first terminal; and sending, at the server, the information collection to the first terminal so that the first terminal displays the information collection along with the scene image shot by the first terminal.

2. The method of claim 1, before the step of obtaining, at the server, the position information of the first terminal running the social network application, the direction information of the first terminal shooting the scene image, and the information search range corresponding to the first terminal, the method further comprising:

obtaining, at the server, the position information of a second terminal running the social network application and distinct from the first terminal and constructing the information collection when the server detects a first social information item published by the second terminal using the social network application, wherein the information collection includes the first social information item; and     marking, at the server, the information collection with a position identifier according to the position information of the second terminal.

3. The method of claim 2, further comprising:

adding, at the server, a second social information item to the information collection when the server detects a social operation on the information collection and a creation of the second social information item.

4. The method of claim 3, wherein the server stores the information collection in a tree structure.

5. A server, comprising:

an obtaining module configured to obtain position information of a first terminal running a social network application and direction information of the first terminal shooting a scene image and an information search range corresponding to the first terminal, wherein the information search range corresponding to the first terminal represents a coverage area with a center of the first terminal location and a radius of a preset distance, and the preset distance is set according to an image capture ability of an image shooting apparatus in the first terminal;

a searching module configured to search, among a plurality of social information items published by one or more terminals running the social network application, for an information collection in the information search range corresponding to the first terminal according to the position information of the first terminal and the direction information of the first terminal shooting the scene image, wherein the information collection includes a subset of the plurality of social information items published by one or more terminals and has a position identifier corresponding to position information of one of the one or more terminals when it submits a corresponding social information item to the server, each social information item being a message posted by a respective user of a terminal using the social network application, and the position identifier is within a direction defined by the direction information of the first terminal when shooting the scene image and within the information search range corresponding to the first terminal; and     an interaction module configured to send the information collection to the first terminal so that the first terminal displays the information along with the scene image shot by the first terminal.

6. The server of claim 5, further comprising:

a constructing module configured to detect a first social information item published by a second terminal running the social network application and distinct from the first terminal, obtain the position information of the second terminal running the social network application and construct the information collection, wherein the information collection includes the first social information item;

a mark module configured to mark the information collection with a position identifier, according to the position information of the second terminal.

7. The server of claim 6, further comprising:

an adding module configured to detect a social operation on the information collection and a creation of the second social information item, and add the second social information item to the information collection in response to the social operation.

8. The server of claim 7, further comprising:

a storage module configured to store the information collection in a tree structure.

9. The method of claim 1, after the step of obtaining, at the first terminal, the scene image shot by the first terminal and displaying the information collection along with the scene image, the method further comprising:

performing, at the first terminal, a social operation on the information collection to generate a second social information item when the first terminal receives a social request for the information collection, and sending the second social information item to the server.

\* \* \* \* \*